United States Patent
Endres et al.

(10) Patent No.: US 8,210,754 B2
(45) Date of Patent: Jul. 3, 2012

(54) RADIAL ROLLER BEARING HAVING HOLLOW ROLLERS

(75) Inventors: Bernd Endres, Unterspicsheim (DE); Christian Hoffinger, Georgensgmuend (DE); Carsten Merklein, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 484 days.

(21) Appl. No.: 12/515,777

(22) PCT Filed: Nov. 16, 2007

(86) PCT No.: PCT/DE2007/002081
§ 371 (c)(1),
(2), (4) Date: Aug. 3, 2009

(87) PCT Pub. No.: WO2008/061507
PCT Pub. Date: May 29, 2008

(65) Prior Publication Data
US 2010/0021101 A1   Jan. 28, 2010

(30) Foreign Application Priority Data
Nov. 22, 2006   (DE) .......................... 10 2006 055 027

(51) Int. Cl.
*F16C 33/34*   (2006.01)
(52) U.S. Cl. ...................................................... 384/567
(58) Field of Classification Search .................. 384/491, 384/494, 564–567, 584
See application file for complete search history.

(56) References Cited

U.S. PATENT DOCUMENTS

| | | | | |
|---|---|---|---|---|
| 3,930,693 A | * | 1/1976 | Bowen | 384/567 |
| 4,002,380 A | * | 1/1977 | Bowen | 384/567 |
| 4,133,587 A | * | 1/1979 | Kume | 384/461 |
| 4,916,981 A | * | 4/1990 | Suzuki et al. | 475/183 |
| 7,032,704 B2 | * | 4/2006 | Zernickel et al. | 180/444 |

FOREIGN PATENT DOCUMENTS

| | | |
|---|---|---|
| DE | 21 23 981 Y | 12/1971 |
| DE | 21 52 125 A | 7/1972 |
| DE | 21 44 269 Y | 3/1973 |
| DE | 23 38 686 A | 3/1974 |
| DE | 198 01 491 Y | 7/1998 |
| DE | 102 00 609 Y | 7/2003 |
| DE | 102 03 283 Y | 8/2003 |
| DE | 102 09 264 Y | 9/2003 |
| DE | 102 16 492 Y | 10/2003 |
| DE | 102 22 266 Y | 12/2003 |
| DE | 10 2004 041 964 Y | 2/2006 |
| FR | 2 479 369 X | 10/1981 |
| GB | 20 04 600 Y | 4/1979 |
| WO | 03/057548 X | 7/2003 |
| WO | 2006/066717 Y | 6/2006 |

* cited by examiner

*Primary Examiner* — Thomas R Hannon
(74) *Attorney, Agent, or Firm* — Lucas & Mercanti, LLP; Klaus P. Stoffel

(57) ABSTRACT

A radial roller bearing shafts in wind turbine transmissions, which includes an external bearing ring with an inner runway, an internal bearing ring arranged coaxial thereto which has an outer raceway and roller bodies on runways between bearing rings spaced circumferentially by a bearing cage and distributed uniformly on a circumference replaced by hollow rollers. To prevent slip, the hollow rollers have a greater diameter and lower modulus of elasticity ensuring, in a load-free state, continuous contact by the radial roller bearing with the bearing rings and continuous drive for the bearing cage and roller bodies at kinematic rotation speed. The hollow rollers have increased bending fatigue strength, and their inner envelope surfaces are formed by mechanical processing for further inherent compression stresses of at least −200 MPa, superimposed on the hollow rollers maximum load stress along with the inherent compression stresses resulting from their heat treatment.

5 Claims, 1 Drawing Sheet

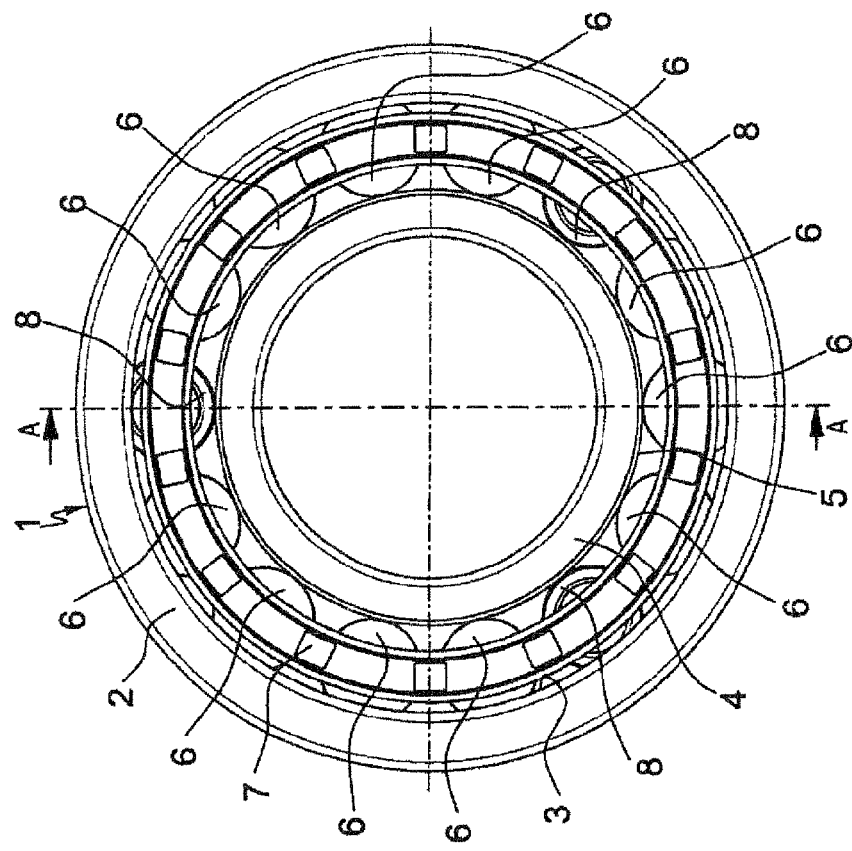
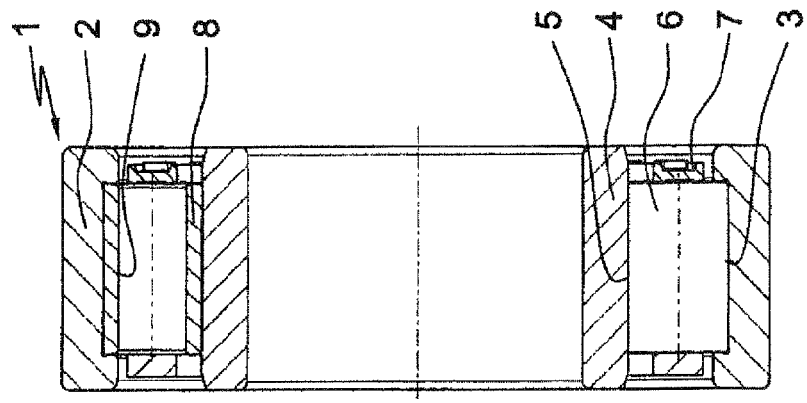

RADIAL ROLLER BEARING HAVING HOLLOW ROLLERS

This application is a 371 of PCT/DE2007/002081 filed Nov. 16, 2007, which in turn claims the priority of DE 10 2006 055 027.7 filed Nov. 22, 2006, the priority of both applications is hereby claimed and both applications are incorporated by reference herein.

FIELD OF THE INVENTION

The invention relates to a radial roller bearing that can be implemented particularly advantageously on bearings which run at a very low load at least at times, for example for the bearing of shafts in wind power transmissions.

BACKGROUND TO THE INVENTION

A person skilled in the art of roller bearing technology will in general be aware that radial roller bearings have an optimum kinematic operating state when sufficiently loaded, at which the roller bodies roll on the raceways of the inner and of the outer bearing ring, without sliding. Furthermore, in the case of radial roller bearings which are operated on low loads at least at times, it is known that the roller body set which comprises the roller bodies and their bearing cage does not rotate at the kinematic rotation speed because of the friction in the bearing or because of the high mass force of the roller body set and the contact force, which is small at times, between the roller bodies and the raceways. In consequence, the rotation speed of the roller body set is less than the kinematic rotation speed, so that the roller bodies are in a kinematically non-optimum state, as a result of which slip occurs between these roller bodies and at least one raceway. In this case, a lubricating film can form on the contact surfaces between the roller bodies and the raceway. However, the lubrication film is destroyed in the event of a sudden change in the rotation speed or load, as a result of which there will no longer be an adequate lubricating film at the contact points where the slip occurs within a very short time. This results in a metallic contact between the raceway and the roller bodies, which slide on the raceway until the roller bodies are accelerated to the kinematic rotation speed. This large speed difference between the raceway and the roller bodies as well as the lack of a separating lubricating film therefore results in high tangential stresses in the surfaces of the raceway and of the roller bodies, which are associated with very severe wear, such as roughening of the raceways, material being torn off and rubbing marks, generally in conjunction with micropitting, thus leading to premature failure of the radial roller bearing.

A radial roller bearing of this generic type has therefore been proposed in FR 2 479 369, which essentially comprises an outer bearing ring with an inner raceway and an inner bearing ring which is arranged coaxially with respect thereto and has an outer raceway, as well as a multiplicity of roller bodies which roll between the bearing rings on their raceways and are held at uniform distances from one another in the circumferential direction by a bearing cage, in which a plurality of roller bodies which are distributed uniformly on the circumference between the roller bodies and the bearing rings, are replaced by hollow rollers in order to avoid the described slip effect and the disadvantages which result from this. These hollow rollers, which additionally are axially somewhat shorter than the other roller bodies, in this case have a slightly larger diameter and a lower modulus of elasticity than the other roller bodies, as a result of which, in the load-free state of the radial roller bearing, they make continuous contact with the bearing rings and therefore ensure a continuous drive of the bearing cage and thus of the other roller bodies at the kinematic rotation speed.

However, in practice, it has been found that the hollow rollers, which are subject to continuous bending fatigue load as a result of their permanent deformation, in radial roller bearings such as these represent potential weak points of the roller bearing in terms of their load capability and fatigue strength, thus resulting in reduced load-carrying capability and a shorter life of the roller bearing. For example, it has been found that local stress peaks occur, in particular, on the inner envelope surfaces of the hollow rollers, leading to cracking and finally to fracture of the hollow rollers during long-term operation of the roller bearing. This was due in particular to the use of standard roller-bearing steel for the hollow rollers and their standard heat treatment, in which the hollow rollers were provided with a continuously martensitic structure by hardening at a temperature of 860° C., quenching in an oil or salt bath and tempering at 190±10° C., a very high level of hardness of which structure admittedly ensures that the hollow rollers have high rolling-over strength, although the low ductility and the lack of inherent compression stresses are unsuitable, in particular for the continuous bending fatigue loads on their inner envelope surfaces. One obvious measure to avoid such stress concentrations would admittedly be to increase the dimensions of both the hollow rollers and the other roller bodies, but this would necessarily result in an increase in the total space required for the bearing and an increase in the production costs for the roller bearing.

OBJECT OF THE INVENTION

Against the background of the described disadvantages of the known prior art, the invention is therefore based on the object of designing a radial roller bearing, in particular for the bearing of shafts in wind power transmissions, which, while greatly retaining its original performance features, such as the load capacity, installation space and service life, is equipped with hollow rollers in order to avoid slip between the roller bodies and the bearing rings, which hollow rollers compensate for the local stress peaks on their inner envelope surfaces by an increased fatigue strength and bending fatigue strength.

DESCRIPTION OF THE INVENTION

According to the invention, this object is achieved in that the inner envelope surfaces of the hollow rollers are formed by way of specific mechanical processing to have further inherent compression stresses of at least −200 MPa, which are superimposed on their maximum load stress in addition to the inherent compression stresses which result from their heat treatment.

The invention is therefore based on the realization that, by mechanically introducing additional inherent compression stresses into the inner envelope surfaces of the hollow rollers, the stresses, together with the inherent compression stresses resulting from the heat treatment of the hollow roller, counteract the tensile stresses which act during bearing operation, it being possible to compensate for the local stress peaks in the hollow rollers, which lead to cracking and finally to fracture of the hollow rollers, and, therefore, to critically increase the bending fatigue strength and fatigue strength of the hollow rollers, as well as the load capability and the service life of such radial roller bearings.

Preferred refinements and developments of the radial roller bearing designed according to the invention are described in the dependent claims.

Accordingly, in one refinement of the invention, the hollow rollers have the same axial length as the other roller bodies and are preferably formed with a total inherent compression stress of between −400 MPa and −800 MPa on their inner envelope surfaces. In this case, designing the hollow rollers to have the same axial length as the other roller bodies contributes to keeping the radial roller bearing load capability losses, which result from the design of the hollow rollers, as low as possible, while the value of the inherent compression stress of between −400 MPa and −800 MPa represents an optimum with regard to the effectiveness of high inherent compression stresses on the inner envelope surfaces of the hollow rollers in order to increase their bending fatigue strength.

According to another refinement, a first possible way to produce additional inherent compression stresses on the inner envelope surfaces of the hollow rollers of the radial roller bearing designed according to the invention in a simple and cost-effective manner is to mechanically process the inner envelope surfaces of the hollow rollers by compacting using hard rolling. This processing method is a shaping process which does not involve cutting and is based on the idea that the strength of machined surfaces is increased under the contact pressure of hardened roller bodies, such as rollers or balls. This is done by plastic deformation of the profile peaks in such a way, that the surface pressure that occurs between the rollers and the material produces three-dimensional compression stresses in the material, which reach the yield stress of the material and therefore result in local plastic deformation or strengthening of the surface, and therefore in high inherent compression stresses in the edge area. In this case, additional inherent compression stresses of up to 31 1000 MPa can be produced in the processed surface, depending on the material and the heat-treatment state. A further positive effect of this method is the simultaneous major reduction in the surface roughness, which leads to a further improvement in the bending fatigue strength of the hollow rollers.

According to a further refinement, a second possible way to produce additional inherent compression stresses in the inner envelope surfaces of the hollow rollers of the radial roller bearing designed according to the invention is to mechanically process the inner envelope surfaces of the hollow rollers by shot blasting. In this surface treatment method, which is also known as shot-blasting strengthening, a blast agent of round shots is used, which is thrown at the surface to be treated at high speed. This is generally done by means of fan-blower, compressed-air or injector blasting installations, in which spherical grains used for blasting are accelerated to a high speed and are impacted onto the surface to be processed. This results in strengthening and plastic deformation in the area of the surface which, in the case of the hollow rollers, depending on the material that is used, produces inherent compression stresses in their inner envelope surfaces of up to the level of the yield limit of the material in the respective heat-treatment state. In order to ensure that the surface roughness is not excessively adversely influenced, technically worthwhile compression stresses resulting from shot blasting are in the range between −800 and 1000 MPA. A further positive effect of this method is the simultaneous major increase in the corrosion resistance of the processed surfaces of corrosion-resistant steels.

Finally, as an alternative third possible way to produce additional inherent compression stresses in the inner envelope surfaces of the hollow rollers of the radial roller bearing according to the invention, the inner envelope surfaces of the hollow rollers can be mechanically processed by calibration. In this case, the expression calibration should be understood as meaning that a hardened body having an external diameter which is slightly larger than the internal diameter of the bore in the hollow rollers is forced through the hole in the hollow roller, likewise resulting in local plastic deformation or strengthening of the surface, and creating high inherent compression stresses in the edge area. A steel ball has been found to be most suitable as a hardened body for this purpose, although a cylindrical body with rounded edges can also be used. The additional inherent compression stresses which can be produced in the processed surface are in this case up to −500 MPa, depending on the material, with a major reduction in the surface roughness also being achieved here, as an advantageous side effect.

The radial roller bearing designed according to the invention therefore has the advantage over the radial roller bearings that are known from the prior art that, while greatly retaining its original performance features such as load capacity, installation space and service life, in order to avoid slip between the roller bodies and the bearing rings it is equipped with hollow rollers, which have an increased bending fatigue strength and fatigue strength as a result of a mechanically produced increase in the inherent compression stresses in their inner envelope surfaces, which already exist as a result of the heat treatment, thus compensating for local stress peaks in the inner envelope surfaces. These advantages are in this case achieved even if the roller bodies are not guided by a bearing cage, but guide themselves, as in the case of fully rolling bearings.

BRIEF DESCRIPTION OF THE DRAWINGS

One preferred embodiment of the radial roller bearing designed according to the invention will be explained in more detail in the following text with reference to the attached drawings, in which:

FIG. 1 shows a side view of a radial roller bearing designed according to the invention; and FIG. 2 shows the cross section A-A through the radial roller bearing designed according to the invention, as shown in FIG. 1.

DETAILED DESCRIPTION OF THE DRAWINGS

The illustrations in FIGS. 1 and 2 clearly show a radial roller bearing 1, which is suitable for the bearing of shafts in wind power transmissions and, in a known manner, comprises an outer bearing ring 2 with an inner raceway 3 and an inner bearing ring 4, which is arranged coaxially with respect thereto and has an outer raceway 5, as well as a multiplicity of roller bodies 6, which roll between the bearing rings 2, 4 on their raceways 3, 5 and are held at uniform distances from one another in the circumferential direction by a bearing cage 7. The drawings likewise clearly show that, in the case of the illustrated radial roller bearing 1, three roller bodies 6, which are distributed uniformly on the circumference, are replaced by hollow rollers 8 in order to avoid slip between the roller bodies 6 and the bearing rings 2, 4, which hollow rollers 8 have a slightly larger diameter and a lower modulus of elasticity than the other roller bodies 6, in order to ensure, in the load-free state of the radial roller bearing 1, a continuous contact with the bearing rings 2, 4 and, thus, a continuous drive for the bearing cage 7 and, thus, for the other roller bodies 6 at a kinematic rotation speed.

In order to ensure that local stress peaks, which could lead to cracking and to fracture of the hollow rollers 8 during continuous operation of the radial roller bearing 1, no longer occur on the inner envelope surfaces 9 of the hollow rollers 8, the hollow rollers 8 are moreover designed in the manner according to the invention to have an increased bending fatigue strength. This is achieved in that the hollow rollers 8 have the same axial length as the other roller bodies 6 and their inner envelope surfaces 9 are formed by specific mechanical processing with further inherent compression stresses, which are superimposed on their maximum load stress, of at least −200 MPa, in addition to the inherent compression stresses which result from their heat treatment, as a result of which the hollow rollers 8 have a total inherent compression stress of between −400 MPa and −800 MPa on their inner envelope surfaces 9. Additional inherent compression stresses such as these can be produced particularly easily and cost-effectively by mechanical processing of the inner envelope surfaces 9 of the hollow rollers 8 by compacting by means of hard rolling, in which three-dimensional compression stresses are produced in the material by the contact pressure of hardened roller bodies, such as rollers or balls, by plastic deformation of the profile peaks, which three-dimensional compression stresses reach the yield stress of the material and thus result in local plastic deformation or strengthening of the surface, and therefore in high inherent compression stresses in the edge area.

LIST OF REFERENCE SYMBOLS

1 Radial roller bearing
2 Outer bearing ring
3 Inner raceway
4 Inner bearing ring
5 Outer raceway
6 Roller body
7 Bearing cage
8 Hollow rollers
9 Inner envelope surfaces

The invention claimed is:

1. A radial roller bearing for a bearing of shafts in wind power transmissions, comprising:

an outer bearing ring with an inner raceway;
an inner bearing ring, which is arranged coaxially with respect thereto and has an outer raceway;
a multiplicity of roller bodies which roll between the outer bearing ring and the inner bearing ring on the outer raceway and the inner raceway respectively and are held in a circumferential direction by a bearing cage; and
hollow rollers arranged between the roller bodies and held in the cage, the hollow rollers aid in preventing slip between the roller bodies and outer bearing ring and the inner bearing ring, and the hollow rollers have a slightly larger diameter and a lower modulus of elasticity than the roller bodies in order to ensure, in a load-free state of the radial roller bearing, a continuous contact with the outer bearing ring and the inner bearing ring and, thus, a continuous drive for the bearing cage and, thus, for the roller bodies at a kinematic rotation speed,
wherein the hollow rollers have have further inherent compression stresses of at least −200 MPa, which are superimposed on a maximum load stress of the hollow rollers in addition to the inherent compression stresses which result from a heat treatment of the hollow rollers.

2. The radial roller bearing as claimed in claim 1, wherein the hollow rollers have a same axial length as the roller bodies and are formed with a total inherent compression stress of between −400 MPa and −800 MPa on their inner envelope surfaces.

3. The radial roller bearing as claimed in claim 2, wherein the inner envelope surfaces of the hollow rollers are mechanically processed by compacting by hard rolling.

4. The radial roller bearing as claimed in claim 2, wherein the inner envelope surfaces of the hollow rollers are mechanically processed by shot blasting.

5. The radial roller bearing as claimed in claim 2, wherein the inner envelope surfaces of the hollow rollers are mechanically processed by calibration.

* * * * *